(12) United States Patent
Lanuzel et al.

(10) Patent No.: US 11,391,359 B2
(45) Date of Patent: Jul. 19, 2022

(54) TOOL FOR USE WITH A BELTED SHEAVE SYSTEM AND METHOD OF USE

(71) Applicant: CARRIER CORPORATION, Palm Beach Gardens, FL (US)

(72) Inventors: Ludovic Lanuzel, Bonsecours (FR); Cyril Menard, Hauville (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 295 days.

(21) Appl. No.: 16/334,850

(22) PCT Filed: Sep. 20, 2016

(86) PCT No.: PCT/IB2016/001489
§ 371 (c)(1),
(2) Date: Mar. 20, 2019

(87) PCT Pub. No.: WO2018/055427
PCT Pub. Date: Mar. 29, 2018

(65) Prior Publication Data
US 2020/0025280 A1   Jan. 23, 2020

(51) Int. Cl.
*F16H 57/00*   (2012.01)

(52) U.S. Cl.
CPC ..... *F16H 57/00* (2013.01); *F16H 2057/0062* (2013.01)

(58) Field of Classification Search
CPC .... H02K 5/26; B23P 19/10; F16H 2057/0062
See application file for complete search history.

(56) References Cited

U.S. PATENT DOCUMENTS

| 2,628,047 | A | | 2/1953 | Herder et al. | |
|---|---|---|---|---|---|
| 3,326,503 | A | * | 6/1967 | Bade | F16M 7/00 248/672 |
| 3,746,289 | A | * | 7/1973 | Johnsen | H02K 5/00 310/91 |
| 4,012,021 | A | | 3/1977 | Duceppe | |
| 4,033,531 | A | | 7/1977 | Levine | |
| 4,260,125 | A | | 4/1981 | Levine | |
| 4,506,179 | A | | 3/1985 | Chernoff et al. | |

(Continued)

FOREIGN PATENT DOCUMENTS

| EP | 2647877 A1 | 10/2013 |
|---|---|---|
| FR | 7530995 | 5/1977 |

OTHER PUBLICATIONS

ISR/WO, Issued May 16, 2017 for related International Application No. PCT/IB2016/001489; 14 pages.

(Continued)

*Primary Examiner* — Christopher M Koehler
(74) *Attorney, Agent, or Firm* — Cantor Colburn LLP

(57) ABSTRACT

A tool assists with maintenance of a belted sheave system. The sheave system includes a belt, a support structure, and a rotational component including a housing detachably engaged to the support structure and a sheave mounted for rotation to the housing and about an axis. The tool includes a rod constructed and arranged to rigidly mount to the support structure with a centerline disposed substantially parallel to the axis. A bracket of the tool is constructed and arranged to be engaged to the housing and is in sliding contact with the rod.

16 Claims, 4 Drawing Sheets

(56) References Cited

U.S. PATENT DOCUMENTS

| | | | | |
|---|---|---|---|---|
| 4,666,122 | A * | 5/1987 | Goodard | H02K 5/26 |
| | | | | 248/666 |
| 6,324,744 | B1 * | 12/2001 | Banks | F02F 7/0046 |
| | | | | 123/195 A |
| 2003/0133818 | A1 | 7/2003 | Quesada et al. | |
| 2004/0164630 | A1 * | 8/2004 | Gautier | H02K 5/26 |
| | | | | 310/89 |
| 2006/0091751 | A1 * | 5/2006 | Gaul | H02K 5/26 |
| | | | | 310/91 |
| 2015/0093269 | A1 * | 4/2015 | Iwano | H02K 5/18 |
| | | | | 417/410.5 |
| 2016/0040762 | A1 * | 2/2016 | Garcia | F16H 7/18 |
| | | | | 474/140 |
| 2018/0019638 | A1 * | 1/2018 | Ben-Omrane | H02K 7/083 |

OTHER PUBLICATIONS

MSC—Industrial Supply Co., http://www.mscdirect.com/industrialtools/frame-base.html.

* cited by examiner

TOOL FOR USE WITH A BELTED SHEAVE SYSTEM AND METHOD OF USE

BACKGROUND

The present disclosure relates to a tool, and, more particularly, to a tool for use with a belted sheave system.

Belted sheave systems are known to use a continuous belt (e.g., serpentine belt) to drive multiple components of any type of machine or system. One, non-limiting, example, of a belted sheave system application may be used on a combustion engine of a vehicle. In this example, the belted sheave system may be driven by the combustion engine and may thereby drive a multitude of components or devices each having a sheave rotated by the belt. Such components may include a compressor for an air conditioning system, an engine coolant pump, an alternator for charging a battery, a belt tensioner for maintaining tension upon the belt, and electric motor and/or generator, and other components.

Any one or more of the rotational components may be heavy, generally awkward to handle, and may be packaged in tight quarters complicating assembly, disassembly, and general maintenance. Improvements in tooling to simplify, for example, maintenance operations is desirable.

SUMMARY

A tool assists with maintenance of a sheave system having a belt, a support structure, and a rotational component including a housing detachably engaged to the support structure and a belt sheave mounted for rotation about an axis to the housing according to one, non-limiting, embodiment. The tool further includes a first rod constructed and arranged to rigidly mount to the support structure, wherein the first rod extends along a first centerline configured to be substantially parallel to the axis; and a first bracket constructed and arranged to be engaged to the housing and in sliding contact with the first rod.

Additionally to the foregoing embodiment, the tool includes a second rod constructed and arranged to rigidly mount to the support structure, wherein the second rod extends along a second centerline configured to be substantially parallel to the first centerline; and a second bracket constructed and arranged to be engaged to the housing and in sliding contact with the second rod, wherein the first rod is circumferentially spaced from the second rod with respect to the axis.

In the alternative or additionally thereto, in the foregoing embodiment, the first rod is substantially horizontal and at least a segment of the first bracket disposed above the first rod is constructed and arranged to be in sliding contact with the first rod.

In the alternative or additionally thereto, in the foregoing embodiment, the first bracket includes a hole for sliding receipt of the first rod.

In the alternative or additionally thereto, in the foregoing embodiment, the first rod includes a threaded end portion for threaded engagement to the support structure.

In the alternative or additionally thereto, in the foregoing embodiment, the sheave system includes a threaded bolt constructed and arranged to extend through a hole in a flange of the housing and into a bore in the support structure for threaded engagement to the support structure, and wherein the first rod is constructed and arranged to replace the threaded bolt during maintenance of the sheave system.

In the alternative or additionally thereto, in the foregoing embodiment, the first rod includes a threaded end portion for threaded engagement to the support structure.

In the alternative or additionally thereto, in the foregoing embodiment, the first bracket is detachably engaged to the housing.

In the alternative or additionally thereto, in the foregoing embodiment, the tool includes a first threaded fastener for detachable engagement of the first bracket to the housing.

In the alternative or additionally thereto, in the foregoing embodiment, the housing includes a threaded bore for threaded receipt of the first threaded fastener.

In the alternative or additionally thereto, in the foregoing embodiment, the rotational component is an electric motor.

A tool according to another, non-limiting, embodiment, assists with maintenance of a sheave system having a belt, a support structure, a rotational component, a belt sheave mounted for rotation about an axis to the rotational component, and at least first and second threaded fasteners adapted to thread into respective first and second threaded bores in the support structure for securing the rotational component to the support structure. The tool further includes a first rod constructed and arranged to thread into the first threaded bore and extend along a first centerline when the first fastener is removed; and a second rod constructed and arranged to thread into the second threaded bore and extend along a second centerline when the second fastener is removed, wherein the second centerline is circumferentially spaced from the first centerline with respect to the axis, and the rotational component is constructed and arranged to suspend from the first and second rods.

Additionally to the foregoing embodiment, the first and second rods slideably extend through respective holes in a housing of the rotational component.

A method of utilizing a tool for assisting in the maintenance of a belt to a sheave of a sheave system according to another, non-limiting, embodiment, includes engaging a rod of the tool to a support structure of the sheave system; suspending a rotational component of the sheave system from the rod; and sliding the rotational component in an axial direction with respect to a rotational axis of the sheave.

Additionally to the foregoing embodiment, the rod includes a threaded end portion for threaded engagement into a threaded bore in the support structure used for mounting of a housing of the rotational component to the support structure.

In the alternative or additionally thereto, in the foregoing embodiment, the method includes removing a threaded fastener from a threaded bore in the support structure and from an opening in the housing; and inserting the rod through the opening.

In the alternative or additionally thereto, in the foregoing embodiment, the method includes threading the rod into the threaded bore.

In the alternative or additionally thereto, in the foregoing embodiment, the method includes sliding of the rotational component reveals the sheave.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
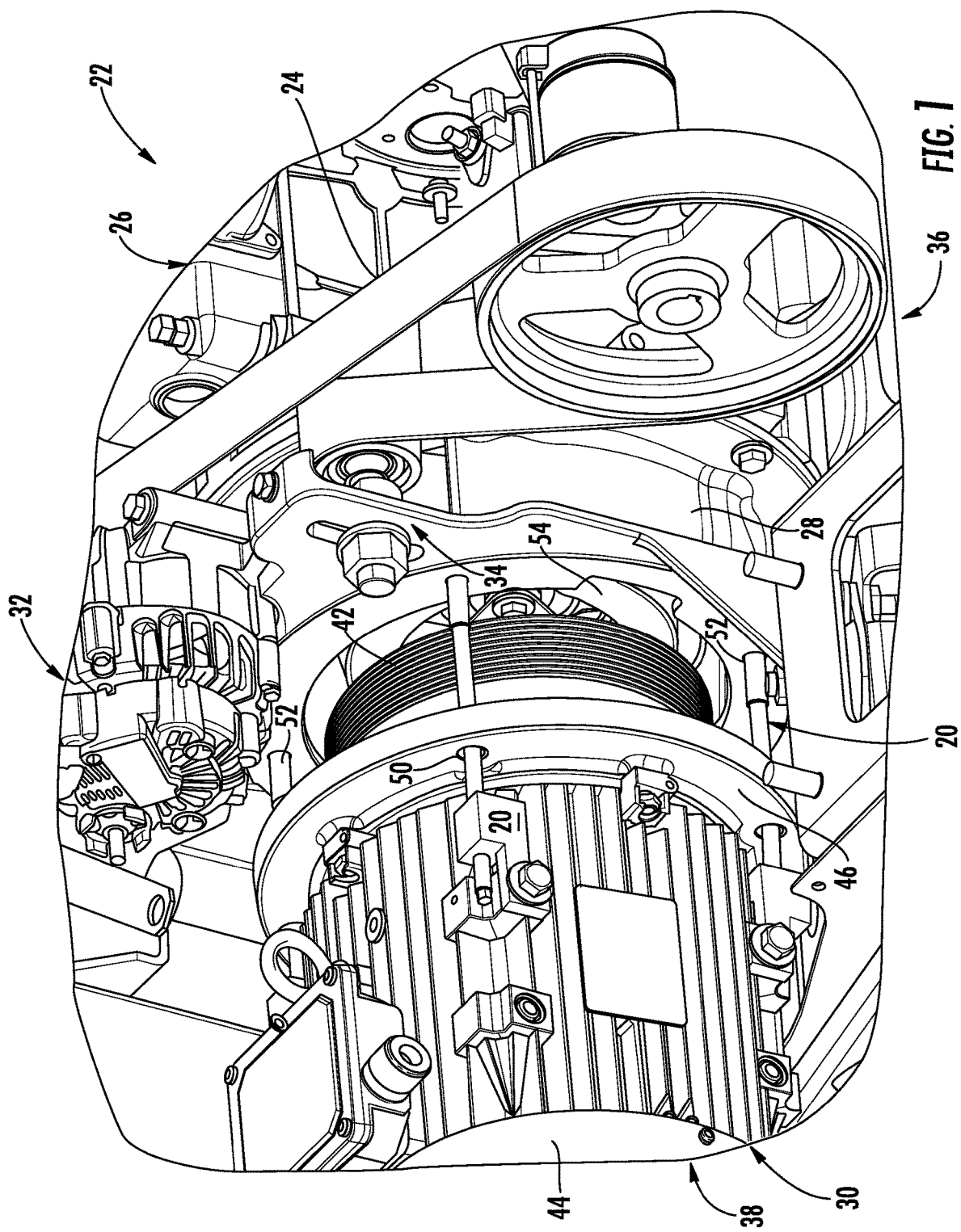
FIG. 1 is a partial perspective view of a belted sheave system with a rotational component of the belted sheave system partially removed utilizing a tool that is one, non-limiting, exemplary embodiment of the present disclosure.

Referring to FIG. 1, a tool 20 is illustrated for use on any variety of belted sheave systems 22 to assist in the mounting and/or removal of a sheave belt 24. One, non-limiting, example of a sheave system 22 may be a system utilized to drive auxiliary components of a combustion engine 26 for a vehicle. The sheave system 22 of the present example may include the belt 24, a support structure 28, and a plurality of rotational components 30, 32, 34, 36 generally driven or rotated by the belt 24. The rotational component 30 may be an electric motor and/or generator generally utilized for the conditioning of, for example, vehicle compartment air. The rotational components 32, 34, 36 may respectively be an alternator for charging a battery, a belt tensioner, and sheave that may be part of a compressor for a refrigeration unit. Any variety or number of other components of the sheave system 22 may also be included. For example, the rotational component 36, or other component, may be a generally free spinning sheave used to properly orientate the belt 24. Each rotational component 30, 32, 34, 36 may be supported by the support structure 28 that may be part of an engine block of the combustion engine 26.

The rotational component 30 may include a housing 38 and a sheave 42 rotationally mounted to, and disposed externally from, the housing 38. The sheave 42 is centered to and rotates about a rotational axis A (see FIG. 2). In one example, and although not specifically illustrated, the sheave 42 may be mounted to a splined end of a rotating shaft that projects outward from the housing 38. The housing 38 may include a casement 44 that may extend continuously about the axis A and may facilitate internal parts of the rotational component 30. A flange 46 of the housing 38 may project radially outward from the casement 44 and with respect to the axis A.

Figure 2:
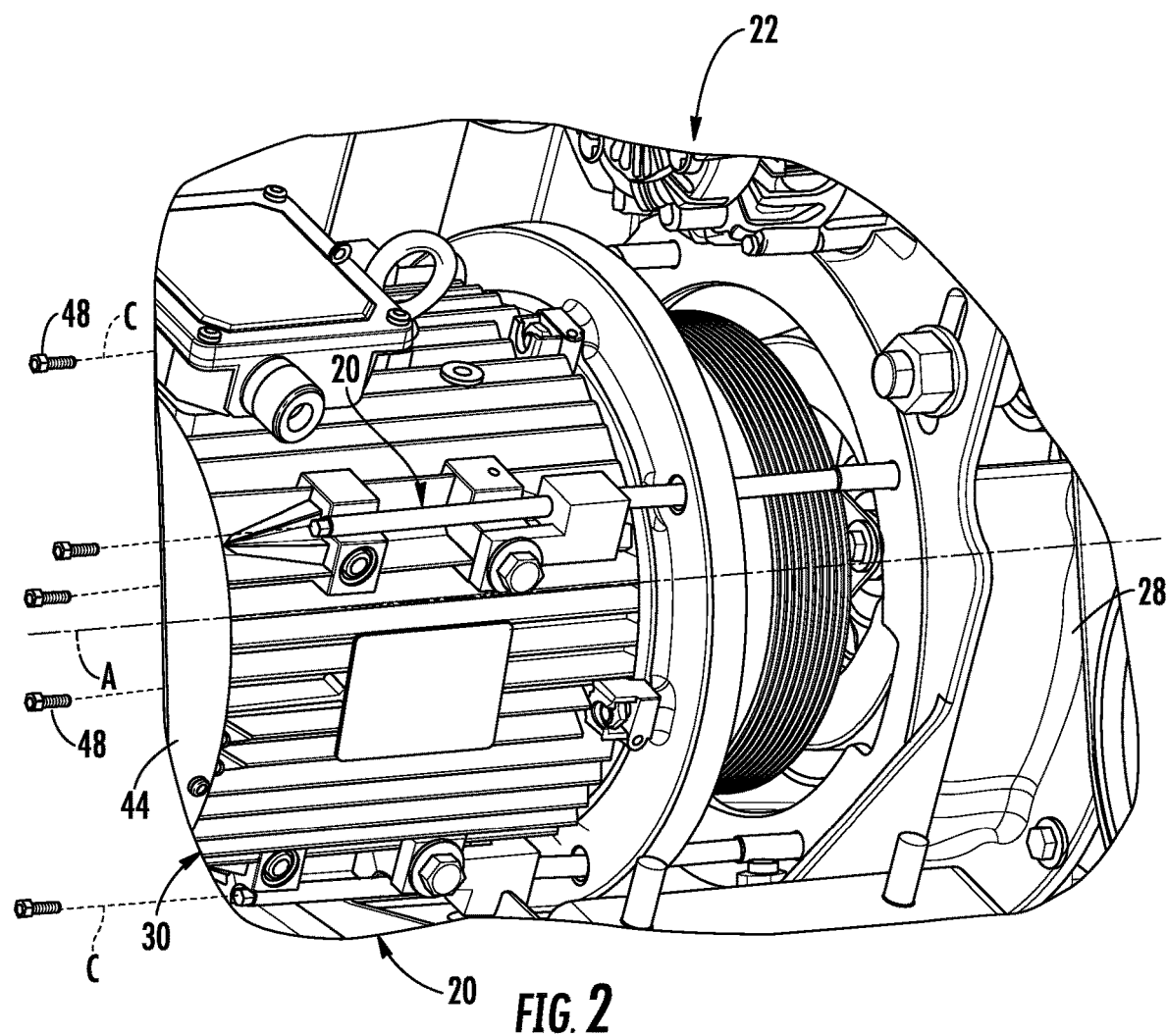
FIG. 2 is a partial perspective view of the belted sheave system with the rotational component installed and illustrating utilization of the tool.

Referring to FIGS. 1 and 2, the rotational component 30 is illustrated in an operational position, except for the tool 20 being installed for axial movement and/or removal of the rotational component 30. When in the operational position, the sheave 42 of the rotational component 30 and the sheave belt 24 may be concealed or obstructed, and generally inaccessible for maintenance, by the support structure 28. When the tool 20 is not being used and the sheave system 22 is assembled and generally functional, the flange 46 of the housing 38 may be rigidly secured to the support structure 28 via a plurality of fasteners or bolts 48 spaced circumferentially apart from one-another (i.e., four illustrated). Each bolt 48 may extend through a respective opening or hole 50 in the flange 46, and may thread into a threaded bore 52 in the support structure 28. When assembled, the sheave 42 may be substantially concealed and disposed in an alcove 54 having boundaries that may be defined by the support structure 28. The sheave belt 24 generally extends into the alcove 54 and wraps about the sheave 42. In operation of the belted sheave system 22, movement of the belt 24 facilitates rotation of the sheave 42, which in-turn operates the rotational component 30 as is known by one having ordinary skill in the art.

Figure 3:
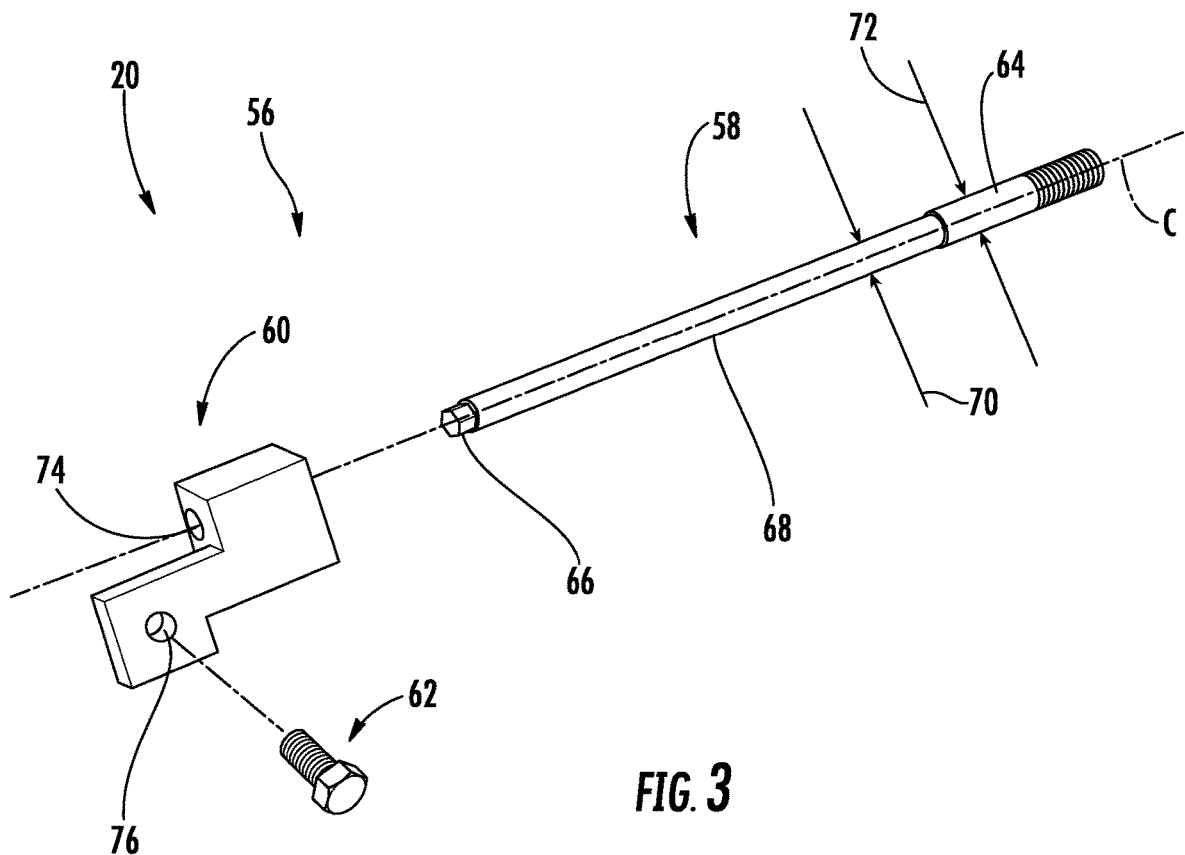
FIG. 3 is an exploded perspective view of a subassembly of the tool.

Referring to FIGS. 2 and 3, the tool 20 may including a plurality of subassemblies 56 circumferentially spaced about axis A (i.e., three subassemblies illustrated with an additional subassembly being hidden in the illustrations by the rotational component 30). Each subassembly 56 may include a rod 58, a bracket 60, and a fastener 62. The rod 58 may include opposite end portions 64, 66 and a mid-portion 68. The first end portion 64 may be threaded for threaded engagement into the threaded bore 52 (see FIG. 1) of the support structure 28. The opposite end portion 66 may include a torqueing feature (e.g., hexagonal shape) for threading the first end portion 64 into and out of the bore 52. The mid portion 68 is generally smooth and may include a diameter (see arrow 70) that is less than a diameter (72) of the threaded end portion 64 to prevent binding of the rotational component 30 to the tool 20 when being axially slid along the rods. The diameter 72 of the threaded end portion 64 may be equal to, or slightly less than, a diameter of the flange hole 50.

The bracket 60 of each subassembly 56 may include a first opening or hole 74 for sliding receipt of the rod 58 and a second opening or hole 76 for receipt of the fastener 62. In one example, the fastener 62 may be a threaded bolt adapted to thread into the casement 44 of the housing 38 for detachable, rigid, engagement of the bracket to the casement 44. Similar to the support structure 28, the casement 44 may include threaded bores (not shown) for receipt of the fasteners 62. The threaded bores in the casement 44 may be dedicated for the fasteners 62 of the tool 20. Thus the casement 44 may be designed in anticipation of the tool usage. Alternatively, the threaded bores may be used for other purposed during normal operation of the belted sheave system 22. Yet further, the brackets 60 may assume other configurations that do not require threaded bores, and instead, are secured to the casement in any variety of ways. For example, the tool 20 may include a band (not shown) constructed and arranged to tighten circumferentially about the casement. Such a band may be a common and integral part of the brackets.

Figure 4:
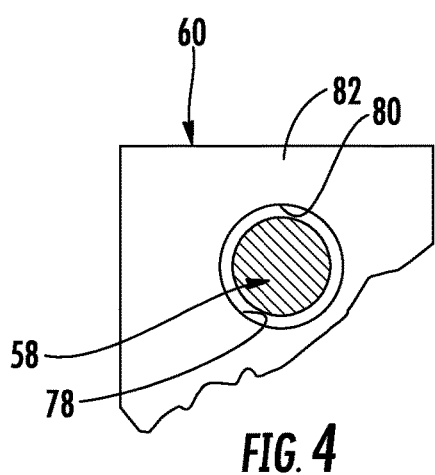
FIG. 4 is a partial cross section of the subassembly.

Referring to FIG. 4, each bracket 60 may carry a smooth surface 78 that may be circumferentially continuous and defines the boundaries of the hole 74. During use of the tool 20 and since the brackets 60 along with the rotational component 30 are suspended from the rods 58, a downward facing section 80 of the surface 78 carried by a segment 82 of the bracket 60 disposed above the rod 58 is generally in sliding and loaded contact with the rod 58. It is contemplated and understood that the surface 78 may not be circumferentially continuous, thus the bracket 60 may not contain a hole 74. Instead and as one, non-limiting, example, the bracket 60 may generally be hook-like to provide the desired suspension capability.

Figure 5:
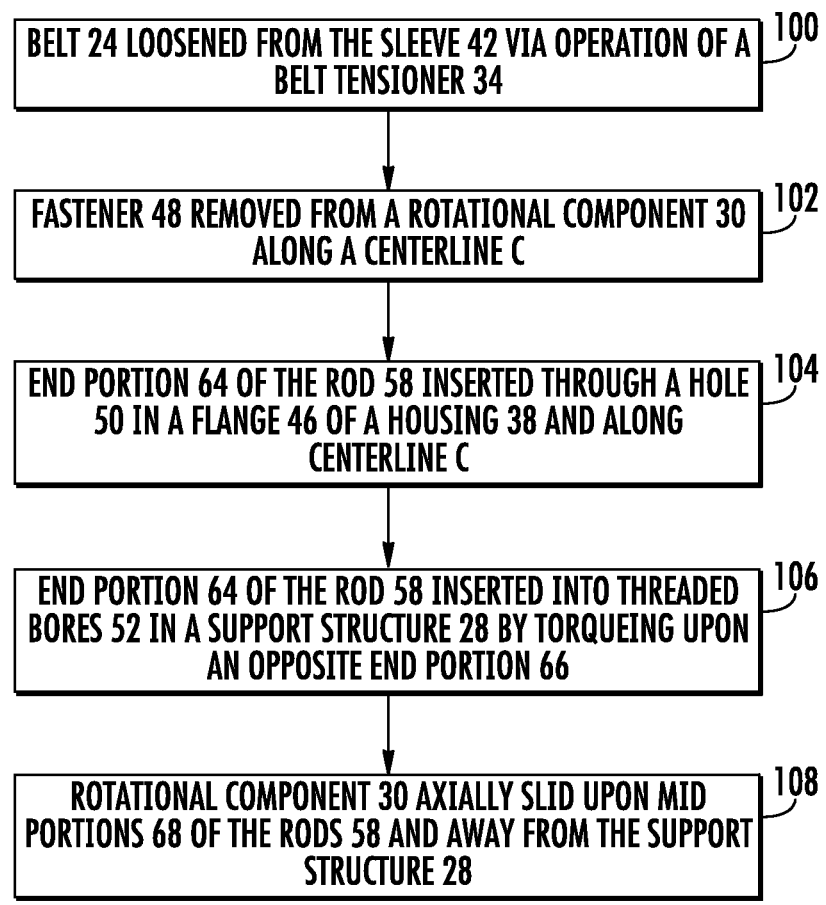
FIG. 5 is a flow chart illustrating a method of utilizing the tool.

Referring to FIG. 5, and during utilization of the tool 20, in block 100, the belt 24 may be loosened from the sleeve 42 via operation of the belt tensioner 34 as is generally known by one skilled in the art. In block 102, the fasteners 48, securing the rotational component 30 to the support structure 28, may be removed from the rotational component 30 along respective centerlines C, which may be substantially horizontal and parallel to axis A. In block 104, the threaded end portions 64 may be inserted through the holes 50 in the flange 46 of the housing 38 and along centerline C. At block 106 and with the end portion 64 of the rod 58 projecting through the flange hole 50, the end portion 64 of the rod 58 may be threaded into the threaded bores 52 in the support structure 28 by torqueing upon the opposite end portion 66. To maintain circumferential alignment of the rotational component 30 to the support structure 28, each fastener 48 may be removed and the rod 58 installed before removing the next fastener 48.

At block 108 and with all of the fasteners 48 removed and with all of the rods 58 installed, the rotational component 30 may be axially slid upon the mid portions 68 of the rods 58 and away from the support structure 28. As the rotational component 30 is suspended from and axially slid along the rods 58, the sheave 42 is revealed and the belt 24 may be removed from the sheave. The same operation, but in reverse order, may be applied to install the rotational component 30.

Advantages and benefits of the present invention include a novel tool 20 that simplifies maintenance of a belted sheave system 22 that may have a rotational component 30 that is heavy and/or awkward to handle, and may be in a tightly packaged environment making access for maintenance, assembly, and/or disassembly difficult. Other advantages may include the omission of traditional and large lifting tools used to perform similar maintenance operations, and reduced costs.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A tool for assisting with maintenance of a sheave system having a belt, a support structure, and a rotational component including a housing detachably engaged to the support structure and a belt sheave mounted for rotation about an axis to the housing, the tool comprising:
a first rod constructed and arranged to rigidly mount to the support structure, wherein the first rod extends along a first centerline configured to be substantially parallel to the axis; and
a first bracket constructed and arranged to be engaged to the housing and in sliding contact with the first rod in a direction parallel to the axis and when the first rod is rigidly mounted to the support structure, wherein the tool is removed for normal operation of the sheave system.

2. The tool set forth in claim 1 further comprising:
a second rod constructed and arranged to rigidly mount to the support structure, wherein the second rod extends along a second centerline configured to be substantially parallel to the first centerline; and
a second bracket constructed and arranged to be engaged to the housing and in sliding contact with the second rod, wherein the first rod is circumferentially spaced from the second rod with respect to the axis.

3. The tool set forth in claim 1, wherein the first rod is substantially horizontal and at least a segment of the first bracket disposed above the first rod is constructed and arranged to be in sliding contact with the first rod.

4. The tool set forth in claim 1, wherein the first bracket includes a hole for sliding receipt of the first rod.

5. The tool set forth in claim 4, wherein the first rod includes a threaded end portion for threaded engagement to the support structure.

6. The tool set forth in claim 1, wherein the first rod includes a threaded end portion for direct threaded engagement to the support structure.

7. The tool set forth in claim 6, wherein the sheave system includes a threaded bolt constructed and arranged to extend through a hole in a flange of the housing and into a bore in the support structure for threaded engagement to the support structure, and wherein the first rod is constructed and arranged to replace the threaded bolt during maintenance of the sheave system.

8. The tool set forth in claim 1, wherein the first bracket is detachably engaged to the housing.

9. The tool set forth in claim 8 further comprising:
a first threaded fastener for detachable engagement of the first bracket to the housing.

10. The tool set forth in claim 9, wherein the housing includes a threaded bore for threaded receipt of the first threaded fastener.

11. The tool set forth in claim 1, wherein the rotational component is an electric motor.

12. A tool for assisting with maintenance of a sheave system having a belt, a support structure, a rotational component, a belt sheave mounted for rotation about an axis to the rotational component, and at least first and second threaded fasteners adapted to thread into respective first and second threaded bores in the support structure for securing the rotational component to the support structure, the tool comprising:
a first rod constructed and arranged to thread into the first threaded bore and extend along a first centerline when the first fastener is removed; and
a second rod constructed and arranged to thread into the second threaded bore and extend along a second centerline when the second fastener is removed, wherein the second centerline is circumferentially spaced from the first centerline with respect to the axis, and the rotational component is constructed and arranged to suspend from the first and second rods.

13. The tool set forth in claim 12, wherein the first and second rods slideably extend through respective holes in a housing of the rotational component.

14. A method of utilizing a tool for assisting in the maintenance of a belt to a sheave of a sheave system, the method comprising:
removing a threaded fastener from a threaded bore in a support structure of the sheave system and from an opening in a housing of a rotational component;
inserting a rod through the opening;
rigidly engaging the rod of the tool to the support structure;
suspending the rotational component of the sheave system from the rod; and
sliding the rotational component in an axial direction with respect to a rotational axis of the sheave, wherein the rod includes a threaded end portion for threaded engagement into the threaded bore in the support structure used for mounting of the housing of the rotational component to the support structure.

15. The method set forth in claim 14 further comprising:
threading the rod into the threaded bore.

16. The method set forth in claim 14, wherein sliding of the rotational component reveals the sheave.

\* \* \* \* \*